United States Patent
Pan

(10) Patent No.: US 7,471,630 B2
(45) Date of Patent: Dec. 30, 2008

(54) SYSTEMS AND METHODS FOR PERFORMING SELECTIVE FLOW CONTROL

(75) Inventor: Jie Pan, Plano, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1293 days.

(21) Appl. No.: 10/141,693

(22) Filed: May 8, 2002
(Under 37 CFR 1.47)

(65) Prior Publication Data

US 2003/0210653 A1    Nov. 13, 2003

(51) Int. Cl.
*G01R 31/08* (2006.01)
*G06F 11/00* (2006.01)
*H04J 1/16* (2006.01)
*H04J 3/14* (2006.01)
*H04L 1/00* (2006.01)
*H04L 12/26* (2006.01)

(52) U.S. Cl. .................................................... 370/235

(58) Field of Classification Search ......... 370/231–236, 370/395, 230, 229, 413, 448, 429, 392, 252, 370/253, 401, 389, 469, 535, 352–355, 254, 370/397, 232–237, 428, 353, 356, 359, 282, 370/238, 400, 371; 398/71; 455/522–525, 455/296, 348, 63.1, 453; 375/346, 350, 229; 709/224, 231, 225, 232, 242, 223, 244, 226, 709/203, 252, 353, 235, 238; 713/1
See application file for complete search history.

(56) References Cited

U.S. PATENT DOCUMENTS

| | | | |
|---|---|---|---|
| 5,928,331 A * | 7/1999 | Bushmitch | 709/231 |
| 6,035,333 A * | 3/2000 | Jeffries et al. | 709/224 |
| 6,115,356 A * | 9/2000 | Kalkunte et al. | 370/229 |
| 6,170,022 B1 | 1/2001 | Linville et al. | |
| 6,198,722 B1 * | 3/2001 | Bunch | 370/229 |
| 6,473,851 B1 * | 10/2002 | Plutowski | 713/1 |
| 6,535,482 B1 * | 3/2003 | Hadi Salim et al. | 370/229 |
| 6,618,357 B1 * | 9/2003 | Geyer et al. | 370/236 |
| 6,628,613 B1 | 9/2003 | Joung et al. | |
| 6,816,903 B1 * | 11/2004 | Rakoshitz et al. | 709/226 |
| 6,859,435 B1 * | 2/2005 | Lee et al. | 370/231 |
| 6,970,424 B2 * | 11/2005 | Fawaz et al. | 370/232 |
| 6,976,089 B2 * | 12/2005 | Na et al. | 709/242 |
| 7,002,911 B1 * | 2/2006 | Linville et al. | 370/230 |
| 7,031,258 B1 * | 4/2006 | Frisch et al. | 370/235 |
| 2001/0037387 A1 * | 11/2001 | Gilde et al. | 709/225 |
| 2002/0035642 A1 * | 3/2002 | Clarke et al. | 709/244 |
| 2002/0131365 A1 * | 9/2002 | Barker et al. | 370/235 |
| 2002/0141427 A1 | 10/2002 | McAlpine | |

(Continued)

OTHER PUBLICATIONS

"Part 3: Carrier Sense Multiple Access with Collision Detection (CSMA/CD) Access method and Physical Layer Specifications", IEEE Std 802.3, 2000 Edition, The Institute of Electrical and Electronics Engineers, Inc., New York, Copyright 2000, pp. 1-1515.

*Primary Examiner*—Wing F. Chan
*Assistant Examiner*—Prenell P Jones

(57) ABSTRACT

A system controls the flow of traffic in a network, especially an Ethernet-based network. The system receives a flow control message indicating that traffic flow to a downstream device is to temporarily cease and determines an appropriate flow control action based on a set of control policies in response to the flow control message. The system then performs the selected flow control action.

16 Claims, 4 Drawing Sheets

U.S. PATENT DOCUMENTS

2003/0012137 A1    1/2003  Abdelilah et al.
2003/0177215 A1*   9/2003  Sutherland et al. .......... 709/223
2003/0185249 A1*  10/2003  Davies et al. ............... 370/535

* cited by examiner

SYSTEMS AND METHODS FOR PERFORMING SELECTIVE FLOW CONTROL

FIELD OF THE INVENTION

The present invention relates generally to communication networks and, more particularly, to systems and methods for controlling the flow of traffic in an Ethernet-based communication network.

BACKGROUND OF THE INVENTION

Service providers commonly find it valuable to allow bursty traffic from customers into the communication network and, similarly, from the network towards customers. To accommodate these traffic bursts, service providers often set a guaranteed service rate and a maximum burst rate in a service contract (e.g., a Service Level Agreement). The service provider may guarantee a fixed rate for the services provided to the customer, but also allow the customer to transmit or receive information at a higher rate, up to the maximum burst rate, when there are accommodating resources in the network.

Due to the increased volume of traffic associated with these bursts, devices in the network, such as a switch, may become congested. Conventional Ethernet networks lack the necessary control mechanisms for handling bursty traffic while still maintaining the intrinsic benefits of the Ethernet networking technology. Many current designs use a buffer to hold excessive traffic when there is congestion or a need for congestion avoidance downstream, and transmit the buffered traffic at the available downstream capacity. Such a design introduces the following drawbacks, however. Since buffer size is limited, packet loss may be experienced in those situations where the excessive traffic causes the buffer to overflow. Such packet loss leads to an unfavorable impact on the service contract. Moreover, buffering introduces delay and delay variation, which may degrade the quality of the services supported.

Another conventional approach to handling bursty traffic involves the use of PAUSE messages, as defined in IEEE Std 802.3, 2000 Edition. In this approach, when a network device detects congestion on an outgoing link, the network device automatically sends a PAUSE message to all upstream devices to which the network device is connected, indicating that the flow of traffic from those upstream devices should temporarily cease. Upon receipt of the PAUSE message at the upstream devices, each device automatically transmits a PAUSE message to each other upstream device to which that device is connected, and so on.

This approach also has some drawbacks. For instance, assume that a customer's network devices are operating at or below the guaranteed service rate defined in their Service Level Agreement. If a network device that is downstream of the customer's devices experiences congestion or receives a PAUSE message, that device will automatically transmit a PAUSE message to the customer's devices causing the devices to temporarily stop transmitting packets. Since the customer's devices are operating at or below their guaranteed service rate, the downstream device unnecessarily restricts the flow of traffic from the customer's devices. Requiring network devices that are operating within their guaranteed service rate to temporarily stop transmitting packets leads to an unfavorable impact on the service contract.

Accordingly, there is a need in the art for systems and methods that improve flow control in an Ethernet-based networking environment.

SUMMARY OF THE INVENTION

In accordance with the principles of this invention as embodied and broadly described herein, a method controls the flow of traffic in a network including a group of nodes. The method includes receiving, from a downstream node, a flow control message indicating that a flow of traffic is to temporarily cease, determining an appropriate flow control action based on at least one of a set of control policies, and performing the appropriate flow control action.

In an implementation consistent with the present invention, a network device includes an input interface that receives a flow control signal, a memory that stores a set of predetermined control policies, and flow control logic. The flow control logic determines a flow control action based on the set of policies and causes the flow control action to be performed.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the present invention provide systems and methods for selectively performing flow control in a communication network. According to one implementation, when a network device receives a flow control signal from a downstream device, the network device determines the appropriate flow control action to be performed based on a predetermined set of control policies.

EXEMPLARY NETWORK

Figure 1:
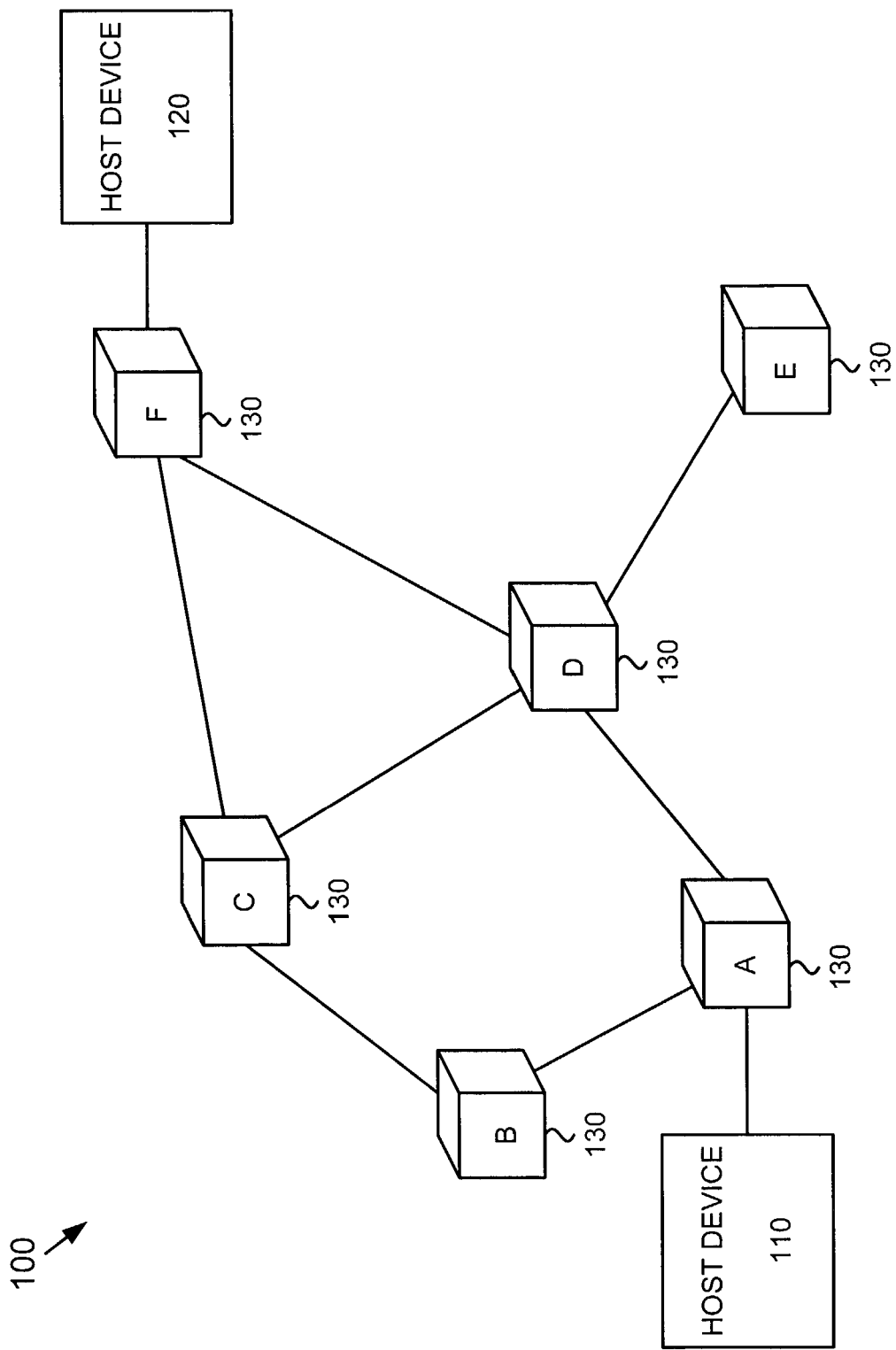
FIG. 1 illustrates an exemplary network in which systems and methods, consistent with the present invention, may be implemented.

FIG. 1 illustrates an exemplary network 100 in which systems and methods, consistent with the present invention, may be implemented. As illustrated, the network 100 includes host devices 110 and 120 and several interconnected nodes 130. Two host devices 110 and 120 and six nodes 130 have been shown for simplicity. A typical network may include more or fewer host devices and nodes. While the host devices 110 and 120 and the nodes 130 are illustrated as separate devices, it will be appreciated that in some implementations consistent with the present invention, a host device may perform the functions of a node and a node may perform the functions of a host device.

The host devices 110 and 120 may include devices, such as mainframes, minicomputers, personal computers, laptops, personal digital assistants, or the like, capable of transmitting data through the network 100. The host devices 110 and 120 may be connected to the nodes 130 via a wired or wireless connection (including optical).

The nodes 130 may include one or more devices for receiving and transmitting data in the network 100. In an exemplary implementation, the nodes 130 may include a Synchronous Optical Network/Synchronous Digital Hierarchy (SONET/SDH) transport node, an Ethernet switching node, or an Internet Protocol/Multiprotocol Label Switching (IP/MPLS) routing/switching node.

Figure 2:
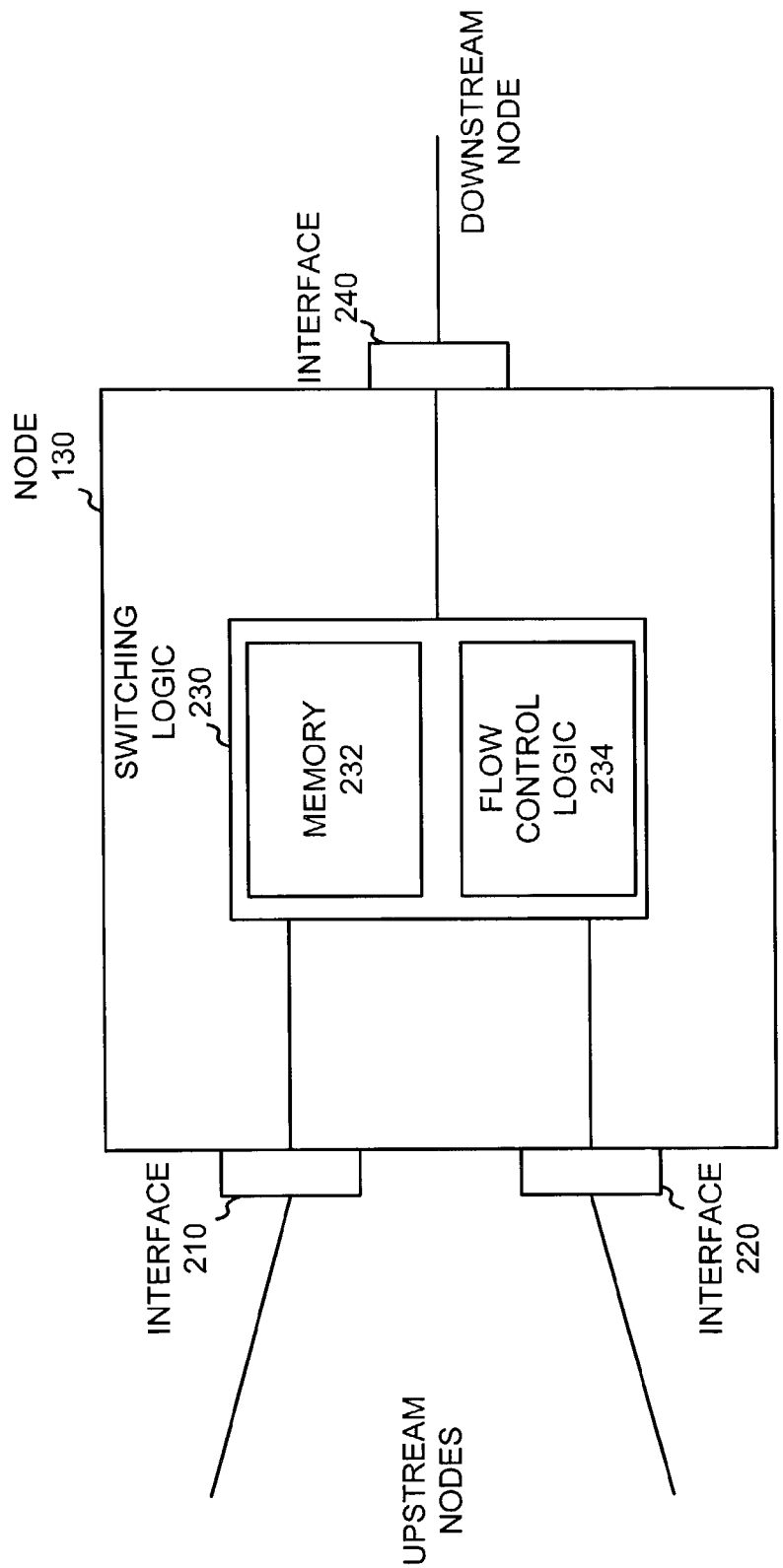
FIG. 2 illustrates an exemplary configuration of node C of FIG. 1 according to an implementation consistent with the present invention.

FIG. 2 illustrates an exemplary configuration of node C 130 of FIG. 1 according to an implementation consistent with the present invention. In this exemplary implementation, node C 130 operates as an Ethernet switch. It will be appreciated that the processing described below is equally applicable to other node configurations. Nodes A, B, and D-F may be configured in a manner similar to that of node C 130.

As illustrated, node C 130 includes interfaces 210, 220, and 240 and switching logic 230. Node C 130 may include additional mechanisms (not shown) that aid in the reception, processing, or transmission of data. Three interfaces have been shown for simplicity. A typical node 130 may include more or fewer interfaces than illustrated in FIG. 2.

Interfaces 210, 220, and 240 may include one or more mechanisms that allow node C 130 to receive data, temporarily store data, and transmit data to a node connected to that particular interface. For example, interface 210 may include one or more buffers for storing data received from or to be transmitted to node B 130. Interface 220 may include one or more buffers for storing data received from or to be transmitted to node D 130. Similarly, interface 240 may include one or more buffers for storing data received from or to be transmitted to node F 130. Interfaces 210, 220, and 240 may also include logic for processing data.

Switching logic 230 may include one or more mechanisms for processing data received via interfaces 210, 220, and 240 in a well-known manner and for switching the data to the appropriate interface for transmission through the network 100. As will be described in additional detail below, switching logic 230 may also include a memory 232 for storing a set of control policies and flow control logic 234 for deciding, based on the policies, how to process flow control messages.

EXEMPLARY PROCESSING

Figure 3:
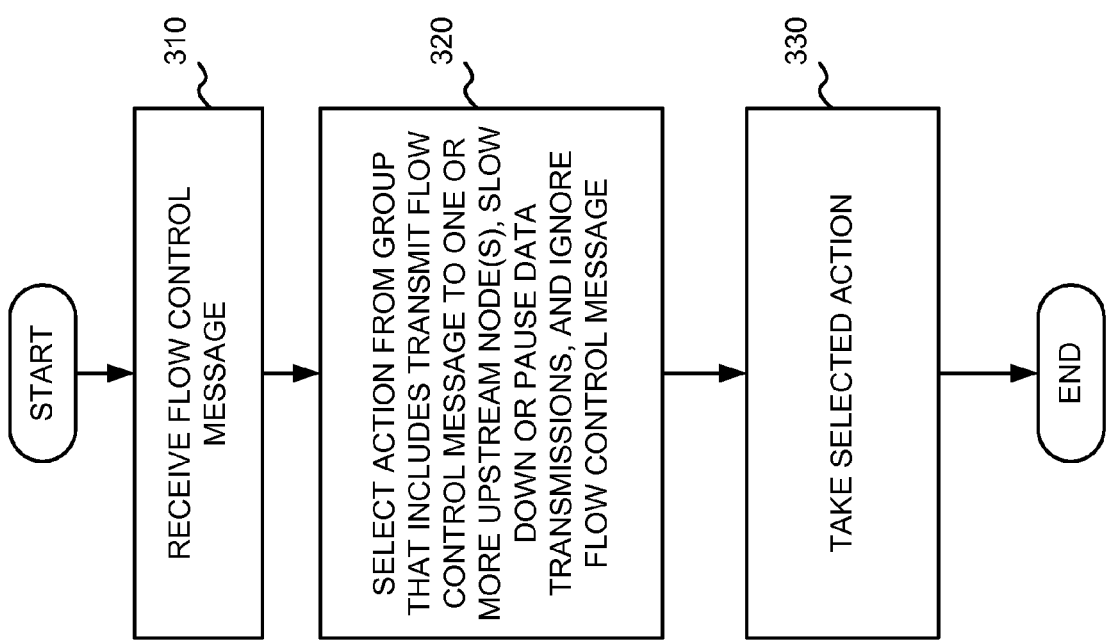
FIG. 3 illustrates an exemplary process for performing selective traffic flow control according to an implementation consistent with the present invention.

FIG. 3 illustrates an exemplary process for performing selective traffic flow control according to an implementation consistent with the present invention. Assume that host device 110 (FIG. 1) transmits data to host device 120. Assume further that node F enters a congested state or detects that host device 120 has entered a congested state. In response, assume that node F transmits a flow control message towards host device 110 requesting to delay sending data. Node F may also transmit a flow control message in order to avoid congestion at one or more downstream nodes. In an exemplary implementation, node F transmits a PAUSE message according to IEEE Std 802.3, 2000 Edition (Incorporating IEEE Std 802.3, 1998 Edition, IEEE Std 802.3ac-1998, IEEE Std 802.3ab-1999, and 802.3ad-2000).

Processing may begin with node C receiving the PAUSE message from node F [act 310] (FIG. 3). Upon receiving the PAUSE message, node C may determine the type of flow control action to take, if any [act 320]. The type of action taken may be based on a set of predetermined policies. These policies may, for example, depend on parameters that have been previously set by users/customers and/or a service provider, and on the current state of the network 100. As described above, these policies may be stored in memory 232 or elsewhere in node C.

Upon receiving the PAUSE message, node C may, for example, decide to generate a corresponding PAUSE message and transmit the message to one or more upstream nodes, such as nodes B and D. In the network 100 illustrated in FIG. 1, node C may decide, for example, to send a PAUSE message to only node B, to nodes B and D, or to only node D. The selection of a subset of upstream nodes may be based on the set of predetermined control policies. For example, node C may select only those upstream nodes that send traffic to node C at a rate above the respective guaranteed service rate.

Alternatively, node C may, upon receiving the PAUSE message, decide to take action to slow down or "PAUSE" the traffic flow to node F. In this case, node C may slow down the transmission of data to node F by reducing the rate at which data is transmitted to node F. Alternatively, node C may stop sending data to node F for a predetermined period of time or until a message is received from node F that data transmissions can resume.

Finally, node C may decide to take no control action at all in response to receiving the PAUSE message (i.e., node C may simply ignore the PAUSE message). Node C may, for example, decide to ignore the PAUSE message in those situations where the traffic flowing from upstream nodes are at or below the guaranteed service rates defined in the service contract.

Once node C has determined the flow control action to take, node C may take the appropriate action [act 330]. That is, node C may generate a corresponding PAUSE message and transmit the message to one or more upstream nodes, slow down or pause the transmission of data to the downstream node (i.e., node F), or ignore the PAUSE message.

Figure 4:
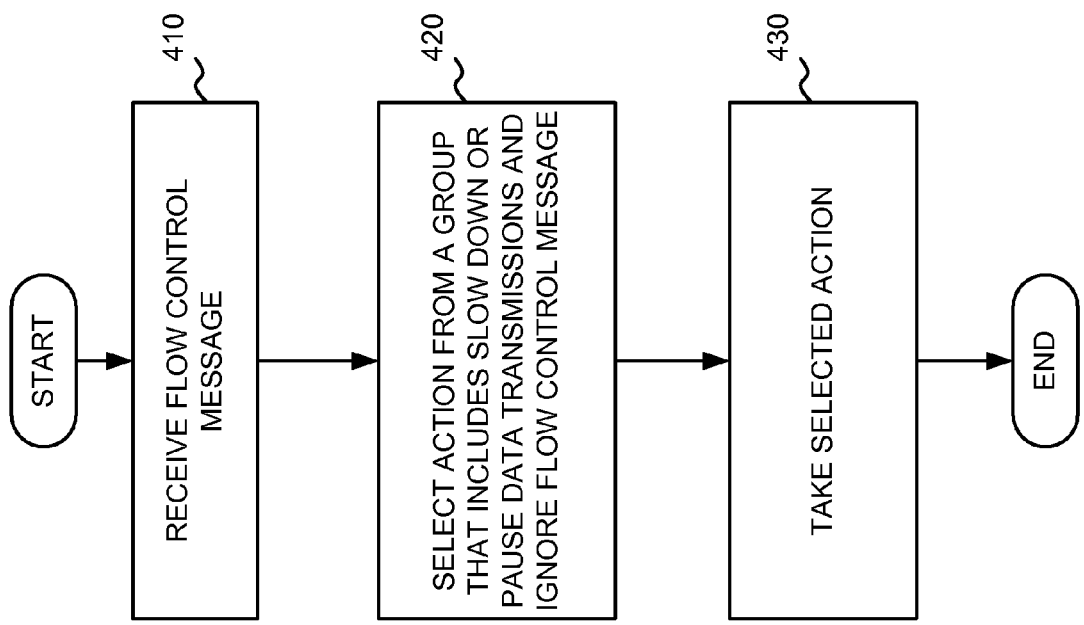
FIG. 4 illustrates an exemplary alternative process for performing selective flow control according to an implementation consistent with the present invention.

The above-described processing may vary slightly when the node that receives the PAUSE message is the device that is the source of the data. FIG. 4 illustrates an exemplary alternative process for performing selective flow control according to an implementation consistent with the present invention. Assume again that host device 110 (FIG. 1) transmits data to host device 120. Assume further that node A enters a congested state or detects its downstream node has entered a congested state. In response, assume that node A transmits a PAUSE message to host device 110 instructing host device 110 to delay sending data.

Processing may begin with host device 110 receiving the PAUSE message [act 410]. Upon receiving the message, host device 110 may determine the type of flow control action to take, if any [act 420]. The type of action taken may be based on a set of predetermined control policies. These policies may, for example, depend on parameters that have been previously set by users/customers and/or a service provider, and on the current state of the network 100.

Upon receiving the PAUSE message, host device 110 may, for example, decide to take action to slow down or temporarily cease the traffic flow to host device 120. Here, host device 110 may reduce the rate or PAUSE the transmission of traffic to node A for a predetermined period of time or until a message is received from node A indicating that data transmissions can resume.

Alternatively, host device 110 may decide to take no control action at all in response to receiving the PAUSE message (i.e., host device 110 may simply ignore the message). Host device 110 may, for example, decide to ignore the PAUSE message in those situations where the amount of data transmitted is at or below the guaranteed service rates defined in the service contract.

Once host device 110 has determined the flow control action to take, host device 110 may take the selected action [act 430]. That is, host device may slow down or temporarily stop the transmission of data to the downstream node (i.e., node A) or ignore the PAUSE message.

CONCLUSION

Systems and methods, consistent with the present invention, provide selective flow control in a communication network. When a network device receives a flow control signal from a downstream device, the network device determines, based on a set of control policies, whether to propagate the flow control signal to one or more upstream devices, halt transmissions of data to a downstream device, or ignore the flow control signal. Such intelligent flow control processing improves network performance particularly in the presence of bursty traffic in any Ethernet-based networks.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above flow control techniques were described as being implemented in an Ethernet environment, the present invention is not so limited. In fact, implementations consistent with the present invention are equally applicable to any networking environment in which traffic flow control is desired. Moreover, while the flow control logic and control policies were described as being located within the switching logic of the node, the flow control logic and control policies may, in an alternative implementation, be located within the interfaces of the node.

It will be appreciated that the present invention can be implemented in hardware, software, or a combination of hardware and software. Thus, the present invention is not limited to any specific combination of hardware circuitry and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. In a network comprising a plurality of nodes, a method, performed by one of the nodes, for controlling a flow of traffic in the network, the method comprising:
   receiving, from a downstream node, a flow control message indicating that a flow of traffic is to temporarily cease;
   determining, in response to receiving the flow control message, an appropriate flow control action based on at least one of a plurality of control policies, the appropriate flow control action being selected from a group that includes propagating the flow control message to at least one upstream node, pausing data transmissions to the downstream node, and ignoring the flow control message; and
   performing the appropriate flow control action.

2. The method of claim 1 wherein the network includes any Ethernet-based network.

3. The method of claim 2 wherein the flow control message includes a PAUSE message, as defined in IEEE Std 802.3, 2000 Edition.

4. In a network comprising a plurality of nodes, a method, performed by one of the nodes, for controlling a flow of traffic in the network, the method comprising:
   receiving, from a downstream node, a flow control message indicating that a flow of traffic is to temporarily cease;
   determining, in response to receiving the flow control message, an appropriate flow control action based on at least one of a plurality of control policies; and
   performing the appropriate flow control action,
   wherein the one node includes a traffic source, and wherein the determining an appropriate flow control action includes:
      selecting the appropriate flow control action from a group that includes pausing data transmissions to the downstream node and ignoring the flow control message.

5. The method of claim 1 wherein the one node includes at least one of a Synchronous Optical Network/Synchronous Digital Hierarchy (SONET/SDH) transport device, an Ethernet switching device, or an Internet Protocol/Multiprotocol Label Switching (IP/MPLS) routing/switching device.

6. The method of claim 1 wherein the at least one control policy is predetermined.

7. The method of claim 1 further comprising:
   selecting the at least one control policy based on user-specified parameters.

8. The method of claim 1 further comprising:
   selecting the at least one control policy based on a current state of the network.

9. A system for controlling a flow of traffic in a network, comprising:
   means for receiving a flow control message, the flow control message requesting that a transmitting device temporarily stop transmitting data;
   means for determining an appropriate flow control action based on at least one of a set of predetermined policies in response to the flow control message, the means for determining including:
      means for selecting the appropriate flow control action from a group that includes propagating the flow control message to at least one upstream node, pausing data transmissions to a downstream node, and ignoring the flow control message; and
   means for performing the appropriate flow control action.

10. A network device comprising:
    an input interface configured to receive a flow control signal;
    a memory configured to store a set of control policies; and
    flow control logic configured to:
       determine a flow control action based on one or more of the control policies in response to the flow control signal, the one or more control policies being selected based on a current state of a network, the flow control action being selected from a group that includes propagating the flow control message to at least one upstream node, pausing data transmissions to a downstream node, and ignoring the flow control message, and
       cause the selected action to be performed.

11. The network device of claim 10 wherein the flow control signal includes an Ethernet PAUSE message, as defined in IEEE Std 802.3, 2000 Edition.

12. A network device comprising:
   an input interface configured to receive a flow control signal;
   a memory configured to store a set of control policies; and
   flow control logic configured to:
      determine a flow control action based on one or more of the control policies in response to the flow control signal, the one or more control policies being based on user-specified parameters, the flow control action being selected from a group that includes propagating the flow control message to at least one upstream node, pausing data transmissions to a downstream node, and ignoring the flow control message, and
      cause the selected action to be performed.

13. The network device of claim 10 wherein the flow control logic is further configured to:
   select the one or more control policies based on a current state of a network.

14. The network device of claim 10 wherein the network device is an Ethernet-based internetworking device.

15. The network device of claim 10 wherein the network device is one of a Synchronous Optical Network/Synchronous Digital Hierarchy (SONET/SDH) transport device, an Ethernet switching device, or an Internet Protocol/Multiprotocol Label Switching (IP/MPLS) routing/switching device.

16. A computer-readable medium containing instructions for controlling one or more processors to perform a method for controlling traffic flow in a network, the method comprising:
   receiving a flow control message, the flow control message requesting that a transmitting device temporarily stop transmitting data;
   determining, in response to receiving the flow control message, an appropriate flow control action based on at least one of a set of predetermined policies, the determining including selecting the appropriate flow control action from a group that includes propagating the flow control message to at least one upstream node, pausing data transmissions to the downstream node, and ignoring the flow control message; and
   performing the appropriate flow control action.

* * * * *